United States Patent [19]
Stark

[11] Patent Number: 5,233,247
[45] Date of Patent: Aug. 3, 1993

[54] PRECISION DRIVE AND SPEED REDUCTION DEVICE

[75] Inventor: Kenneth W. Stark, Adelphi, Md.

[73] Assignee: The United States of America as represented by the Secretary of the Navy, Washington, D.C.

[21] Appl. No.: 730,620

[22] Filed: Jul. 16, 1991

[51] Int. Cl.$^5$ .................... H02K 7/10; H02K 37/22; H02K 37/24; F16D 3/04

[52] U.S. Cl. .................... 310/83; 310/75 D; 310/49 R; 464/79

[58] Field of Search .......... 74/17.8, 18, 640; 310/75 D, 83; 464/79, 80

[56] References Cited

U.S. PATENT DOCUMENTS

| | | | |
|---|---|---|---|
| 1,501,187 | 7/1924 | Rayfield | 464/80 |
| 1,752,106 | 3/1930 | Persons | 464/79 |
| 2,936,644 | 5/1960 | Miller | 310/83 |
| 3,495,108 | 2/1970 | Van Buskirk | 310/83 |
| 3,735,165 | 5/1973 | Touchman et al. | 310/75 D |
| 3,757,147 | 9/1973 | Lyman, Jr. | 310/49 |
| 4,087,709 | 5/1978 | Haydon | 310/83 |
| 4,709,178 | 11/1987 | Burr | 310/91 |
| 5,043,613 | 8/1991 | Kurata et al. | 310/49 R |

FOREIGN PATENT DOCUMENTS 172971  7/1906  Fed. Rep. of Germany ........ 464/79

*Primary Examiner*—Steven L. Stephan
*Assistant Examiner*—C. LaBalle
*Attorney, Agent, or Firm*—Charles J. Stockstill; Thomas E. McDonnell

[57] ABSTRACT

A method and device for precisely driving a rotary object includes a motor mounted in a housing and a reduction device comprising first and second harmonic drives, which connect the motor to the object to be driven via an output shaft. The output shaft is connected to the object to be driven via an adapter cup and a bellows which is stiff in torsion but which tolerates misalignments between the drive device and the object. All elements are designed to maximize stiffness and precision and to minimize backlash while maintaining maximum concentricity between the elements.

6 Claims, 2 Drawing Sheets

PRECISION DRIVE AND SPEED REDUCTION DEVICE

BACKGROUND OF THE INVENTION

The present invention relates to a drive device and more particularly relates to a drive device having a rotary motor and a reduction device which connects the motor to the object to be driven while tolerating considerable shaft angular and radial misalignments between the object to be driven and the drive device.

In a wide variety of applications in which precise control of the amount of rotation of a rotary device is important, it is imperative that the output of a motor be precisely reduced and transferred to the input of the rotary device. For example, the rotation of siderostat mirrors must be precisely controlled through extremely small increments to allow the mirrors to track celestial objects. Worm and worm wheel drives are typically used to drive the mirrors. However, precise control of the rotation of such mirrors or of any relatively large object is difficult, since rotation of such devices tends to produce backlash which reduces the precision of the drives.

Spring loaded devices have been provided in some of these previously-known drives to remove the backlash resulting from the rotation of the driven objects. While these spring-loaded devices help prevent backlash, they have the disadvantage of accelerating wear of the teeth of the worm gears by increasing the contact forces between the gears. In addition, these anti-backlash devices limit the rotational stiffness of the device. Such a reduction of stiffness decreases the precision of a drive since the mirror is relatively heavy.

In addition, worm wheel drives are often incapable of providing sufficient gear reduction. Those devices which do employ multiple reduction devices to provide the required degree of reduction tend to be relatively large. This can be disadvantageous in applications in which the drive devices must be positioned in relatively small spaces.

Another problem present in systems using worm wheel drives is the inability of the drives to provide the degree of reduction needed to provide for very small rotations of the mirror while still minimizing backlash and maximizing stiffness.

All of these problems are compounded if the object to be driven is radially or axially misaligned with the drive device, since such a misalignment may give rise to axial or radial forces that may hamper the operation of the device or even damage the device. Of course, the problems associated with such reduction devices are not limited to drives for siderostat mirrors, but also arise in any application where precise control of the rotation of an object is important.

SUMMARY OF THE INVENTION

It is therefore an object of the invention to provide a drive device which is very precise, which exhibits high stiffness, and which minimizes backlash, even at high torques.

Another object of the invention is to provide a drive device which is durable and which maintains its precision even when angular and radial misalignments exist between the drive device and the object to be driven by the drive device.

Another object of the invention is to provide a drive device which is relatively compact.

In accordance with a first aspect of the invention, a precision drive and speed reduction device comprises a housing, a motor mounted in the housing and having a rotary output shaft, and a reduction device. The reduction device comprises a first gear reducer which is mounted in the housing coaxial with the motor, which has an input element connected to the output shaft of the motor, and which has a rotary output element, and a second gear reducer which is mounted in the housing coaxial with the first gear reducer and which has an input element connected to the output element of the first gear reducer. An output shaft is rotatably mounted in the housing coaxial with the second gear reducer and which is connected to the reduction device, and means are provided for connecting the output shaft to an object to be driven. The means for connecting provide a precise coupling of the output shaft to the object to be driven when angular and radial misalignments exist between the output shaft and the object to be driven.

According to another aspect of the invention, the first and second gear reducers comprise first and second harmonic drives, respectively. The output element of the first harmonic drive is connected to the input element of the second harmonic drive via a rigid coupling which assures a high degree of concentricity between the first and second harmonic drives. The second harmonic drive is connected to the output shaft. In addition, a shaft is provided having a first end which is connected to the output shaft via a flexible coupling and a second end which is rotatably supported on the output element of the first harmonic drive.

According to another aspect of the invention, the means for connecting comprises a bellows and an adapter cup. The adapter cup has an end plate which is located proximate the output end of the housing and which is connected to the output shaft and a shell which extends axially from the end plate towards the input end of the housing. The shell has a distal end which is rotatably mounted on the housing and which is connected to the bellows.

Another object of the invention is to provide a method of precisely driving a rotating object through a predetermined arc.

In accordance with one aspect of the invention, the method includes the steps of actuating a motor to rotate through a first predetermined arc, and then reducing the first predetermined arc to a second, smaller, predetermined arc via a first gear reducer which is coaxial with the motor. Subsequent steps include reducing the second predetermined arc to a third, smaller, predetermined arc via a second gear reducer which is coaxial with the first gear reducer, and rotating an output shaft, which is coaxial with the second gear reducer, through the third predetermined arc. A final step includes rotating the object through the predetermined arc via an element which connects the output shaft to the object and which compensates for radial and axial misalignments between the output shaft and the object.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawing in which like reference numerals represent like parts throughout, and in which.

DETAILED DESCRIPTION OF THE PREFERRED EMBODIMENTS

Figure 1:
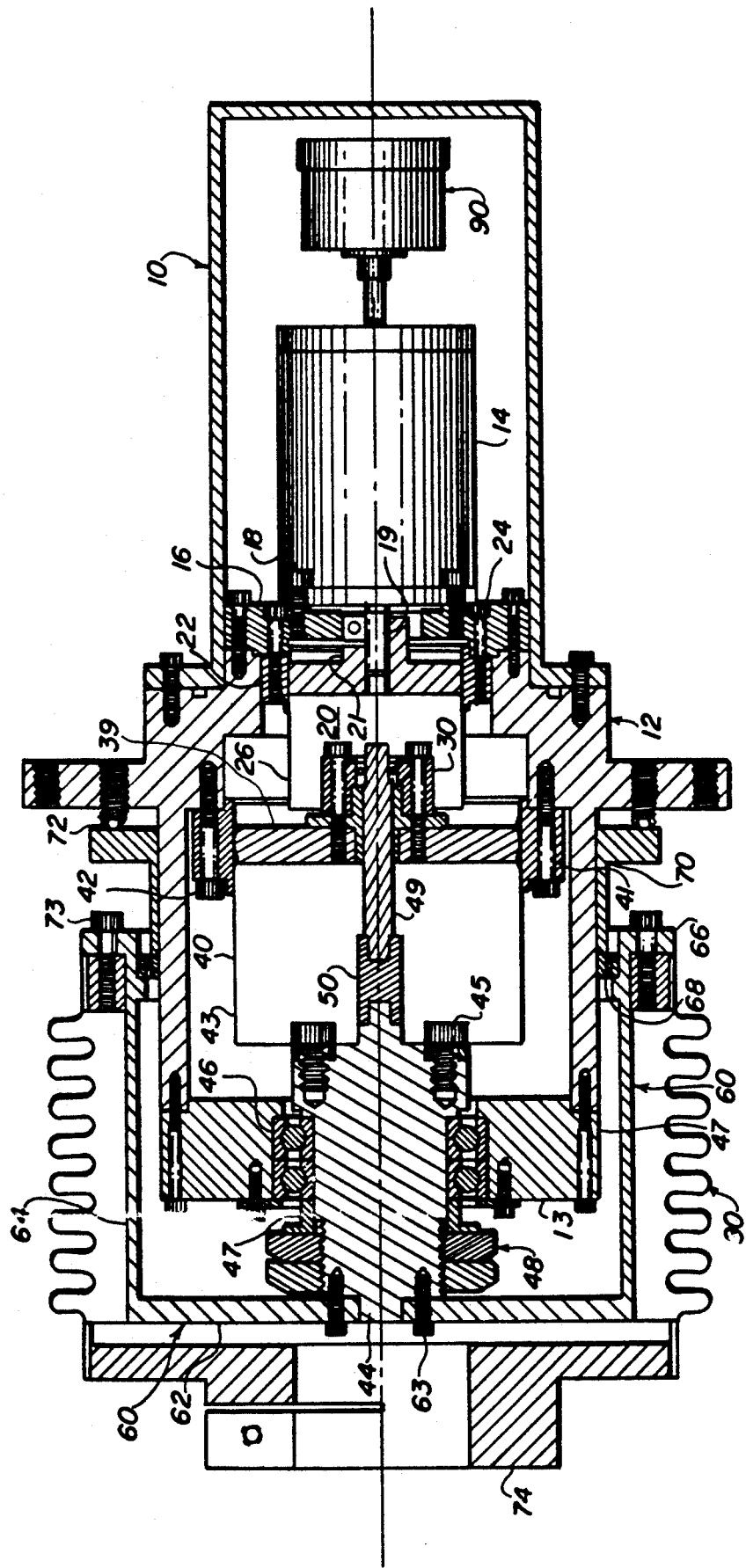
FIG. 1 is a side sectional view of a drive and reduction device constructed in accordance with a preferred embodiment of the invention.

Referring to FIG. 1, a drive and gear reduction device 10 includes a housing 12 in which a motor 14, a reduction device including first and second gear reducers 20 and 40, and an output shaft 44 are arranged coaxially in series. The output shaft 44 is connected to an adapter cup 60 which is in turn connected to the object to be driven 74 via a bellows 80. If desired, a damper 90 may be provided to damp fluctuations of the motor 14. This damper is not essential to the operation of the drive device, and may be omitted if desired.

In the preferred embodiment, a stepper motor is used as the motor 14 because a stepper motor is capable of accurately providing a specific, discrete output for a given input. Although any commercially available stepper motor could be used for this purpose, the housing of the motor 14 should be precision machined so that radial play of the output is minimized and so that the motor 14 can be securely connected to an annular portion 16 of the housing 12 via suitable fasteners 18 so as to enable the output shaft 19 to have a high degree of concentricity relative to the first gear reducer 20. Such an arrangement would increase the precision and sturdiness of the drive device while decreasing wear. The opposite end of the motor 14 is connected to the damper 90 in a conventional manner.

While any gear reduction devices could be used as the gear reducers, harmonic drives are preferred for their precision and their ability to minimize backlash. Each of the gear reducers 20 and 40 preferably comprises a conventional harmonic drive device which provides a precise gear reduction of, e.g., 100:1. The typical harmonic drive device includes an elliptical wave generator acting as an input for the device, a rigid, circular spline which is fixed to the housing 12, and a flex spline operating as the output of the device. Harmonic drive devices typically incorporate a natural gear preload which significantly reduces backlash within the drive. A suitable harmonic drive of this type is manufactured and sold by Harmonic Drive, a division of Quincy Technologies, Inc.

The first harmonic drive 20 precisely reduces the rotational output of the motor 14 to a rotational output of lesser magnitude. The wave generator 21 of the first harmonic drive 20 is connected to the output shaft 19 of the motor 14, the circular spline 22 is fixed to the annular portion 16 of housing 12 via suitable fasteners 24, and the flex spline 26 is connected to the wave generator 39 of the second harmonic drive 40 via a rigid coupling 30.

Figure 2:
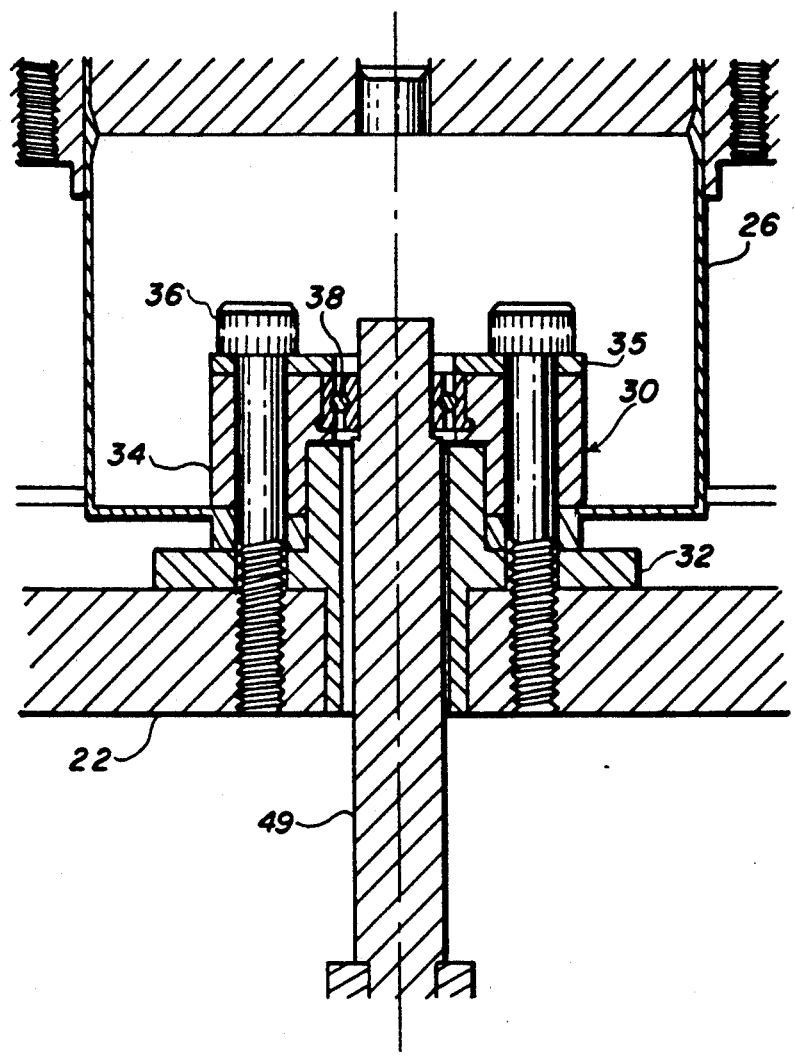
FIG. 2 is an enlarged view of a portion of the device illustrated in FIG. 1.

Referring to FIG. 2, the rigid coupling 30 preferably comprises an annular shoulder 32 which cooperates with a bearing assembly 34 which is attached to the flex spline 26 of the first harmonic drive 20 and which is connected to the second harmonic drive 40 via an end cap 35 and bolts or screws 36 extending through the bearing assembly 34. The bearing assembly 34 supports a bearing 38 which rotatably supports a shaft 49 in a manner discussed in more detail below. The coupling 30 assures high concentricity between the output of the first harmonic drive 20 and the input of the second harmonic drive 40.

Referring again to FIG. 1, the second harmonic drive 40 precisely reduces the rotational output of the first harmonic drive 20 to a rotational output of lesser magnitude, and includes a wave generator 39 connected to the flex spline 26 of the first harmonic drive 20, a rigid, circular spline 41 connected to the housing 12 via fasteners 42, and a flex spline 43. The flex spline 43 of the second harmonic drive 40 is connected to the input end of the output shaft 44 via bolts 45. Output shaft 44 is precision machined to obtain a high degree of roundness, thus increasing further the precision of the device. The output end of the shaft 44 is securely connected to the adapter cup 60 via suitable fasteners such as bolts 63. The shaft 44 is rotatably mounted in the housing 12 via duplex bearings 46 mounted in an annular collar 13 of the housing 12. The duplex bearings 46 are preloaded by an annular sleeve 47 and a pair of lock nuts 48 which are threadedly mounted on the output shaft 44. By applying an axial force on the inner race of the duplex bearings 46, the sleeve 47 axially and radially preloads the bearings to minimize backlash and to reduce play.

Figure 3:
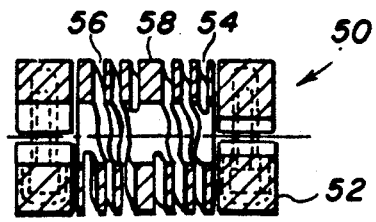
FIG. 3 is a side sectional view of a flexible coupling used in the device of FIG. 1.

The input end of the output shaft 44 is also connected to a first end of shaft 49 by a flexible coupling 50. Such couplings are well-known in the art, and one such coupling, which is manufactured under the trade name Multi Beam and which is particularly well-suited for use in the present invention, is illustrated in FIG. 3. This coupling comprises a cylindrical metal member 52 having helical grooves 54, 56 cut into the periphery of the member on either side of a solid ring 58. This coupling allows limited rotational motion of the ends of the member 50 relative to one another, while assuring concentricity of the first harmonic drive 20 and the shaft 49.

The other end of shaft 49 extends through coupling 30 and is rotatably mounted in the bearing assembly 34. This shaft prevents the first harmonic drive 20 from moving axially or "walking" during operation of the drive, thus increasing further the precision of the device.

The adapter cup 60 includes a radial end plate 62 to which the output shaft 44 is connected via the fasteners 63 and a generally cylindrical shell 64 extending axially from the end plate 62 towards the input end of the housing 12. The distal end 66 of the shell 64 of the adapter cup 60 is rotatably mounted on the housing 12 via a bearing 68, which is in turn lightly preloaded by an annular sleeve 70 and a spring-loaded plunger 72 to reduce axial play. The bellows 80 is connected at one end to the distal end 66 of the adapter cup 60 via bolts or screws 73 and at the other end to the object 74 to be driven. The bellows 80 must be very stiff in torsion, i.e., in the direction of rotation of the drive, so as to precisely transmit the rotation of the adapter cup 60 to the object 74 to be driven with a minimum of radial deflection, but must be otherwise sufficiently flexible in all other directions to allow for substantial radial and angular misalignment between the drive and reduction device 10 and the object 74 to be driven. This allowance for a misalignment is important since a misaligned driven object would otherwise greatly increase the wear of the various components of the device and could actually destroy the drive. This is because, since all of the components of the drive 10 are designed so as to minimize play, the drive has little or no play to make up for such misalignments. The required combination of properties is provided by providing a bellows which is very stiff but which is relatively long.

Providing the relatively long bellows would significantly increase the length of the device were it not for the provision of the adapter cup 60, which allows for the provision of an effective connection of the relatively long bellows 80 to the output shaft 44 at a position which is aligned with or even axially in front of the input end of the output shaft 44. It can thus be seen that the adapter cup 60 significantly reduces the axial length of the device.

In operation, the device operates as follows. When rotation of the object 74 to be driven is desired, the step motor 14 is actuated to rotate through a predetermined angular arc. The output shaft 19 of the motor 14 rotates the wave generator 21 of the first harmonic drive 20 which in turn rotates the flex spline 26 of the first harmonic drive 20 through a second, smaller angle of rotation. The flex spline 26 of first harmonic drive 20 rotates the wave generator 39 of the second harmonic drive 40, which rotates its flex spline 43, which in turn rotates the output shaft 44 through a third angle of rotation which is smaller than either of the first or second angles of rotation. The two harmonic drives 20 and 40 of the reduction device 10 thus determine the overall speed reduction and torque multiplication ratios of the device.

The output shaft 44 rotates the adapter cup 60 and bellows 80, which in turn rotate the object 74 to be driven. The bellows 80 compensates for any radial or angular misalignment between the object 74 to be driven and the output shaft 44 of drive and reduction device 10.

If the drive device is used to position a siderostat mirror, separate drive devices would be provided to alter the elevation of the mirror and the azimuth of the mirror, respectively.

Of course, various modifications and additions could be incorporated without departing from the spirit and scope of the invention. For example, in an application where the length of the device is unimportant, the adapter cup could be eliminated and the bellows could be connected directly to the output shaft or to a plate attached to the end of the output shaft. Moreover, if significant misalignment between the drive and the object to be driven is not possible or is of little concern, the bellows could be replaced by a more conventional flexible connector linking the output shaft to the object to be driven.

The speed reduction and torque reduction ratios of the device could be altered by replacing the harmonic drives with drives of different reduction ratios. Moreover, the reduction ratios could be increased by adding further drives in series between the second drive and the output shaft.

What is claimed is:

1. A precision drive and speed reduction device comprising:
    a housing:
    a motor mounted in said housing and having a rotary output element;
    a reduction device comprising:
    a first gear reducer which is mounted in said housing coaxial with said motor, which has an input-element connected to said output element of said motor, and which has a rotary output element, and
    a second gear reducer which is mounted in said housing coaxial with said first gear reducer and which has an input element connected to said output element of said first gear reducer, said first and second gear reducers comprising first and second harmonic drives, respectively;
    an output shaft which is rotatably mounted in said housing coaxial with said second gear reducer and which is coupled to said reduction device, said output shaft being mounted in said housing via a pair of duplex bearings, and further comprising means for preloading said duplex bearings, said means for preloading comprising an annular sleeve which surrounds said output shaft and a pair of lock nuts which bias said annular sleeve into axial contact with said duplex bearings; and
    means for connecting said output shaft to an object to be driven, said means for connecting providing a precise coupling of said output shaft to said object to be driven despite any angular or radial, misalignments which may exist between said output shaft and said object to be driven.

2. A precision drive and speed reduction device comprising:
    a housing;
    a motor mounted in said housing and having a rotary output element;
    a reduction device comprising:
        a first gear reducer which is mounted in said housing coaxial with said motor, which has an input element connected to said output element of said motor, and which has a rotary output element, and
        a second gear reducer which is mounted in said housing coaxial with said first gear reducer and which has an input element connected to said output element of said first gear reducer;
    an output shaft which is rotatably mounted in said housing coaxial with said second gear reducer and which is coupled to said reduction device; and
    means for connecting said output shaft to an object to be driven, said means for connecting providing a precise coupling of said output shaft to said object to be driven despite any angular or radial misalignments which may exist between said output shaft and said object to be driven, said means for connecting comprising a bellows;
    said housing has input and output ends, and wherein said means for connecting further comprises an adapter cup having;
        an end plate which is located proximate said output end of said housing and which is connected to said output shaft and
        a shell which extends axially from said end plate towards said input end of said housing and which has a distal end which is rotatably mounted on said housing and which is connected to said bellows.

3. The device of claim 2, further comprising a bearing via which said distal end of said shell is supported on said housing, an annular sleeve surrounding said housing, and a spring-loaded plunger biasing said sleeve into contact with said bearing, thereby preloading said bearing.

4. The device of claim 3, wherein said motor comprises a stepper motor which is mounted in a motor housing which is in turn securely connected to said housing.

5. A precision drive and speed reduction device comprising:

a housing;

a motor mounted in said housing and having a rotary output element;

a reduction device comprising a first gear reducer which is mounted in said housing coaxial with said motor, which has an input element connected to said output element of said motor, and which has a rotary output element, and a second gear reducer which is mounted in said housing coaxial with said first gear reducer and which has an input element connected to said output element of said first gear reducer;

an output shaft which is rotatably mounted in said housing coaxial with said second gear reducer and which is coupled to said reduction device;

means for connecting said output shaft to an object to be drive, said means for connecting providing a precise coupling of said output shaft to said object to be driven despite any angular or radial misalignments which may exist between said output shaft and said object to be driven; and means for preventing axial movement of said output element of said first gear reducer, said means for preventing comprising a shaft which is connected to said output shaft and to said output element of first gear reducer.

6. A method of rotatably driving an object through a predetermined angular arc, said method comprising the steps of:

actuating a motor to rotate through a first predetermined arc; then reducing said first predetermined arc to a second, smaller, predetermined arc via a first gear reducer which is coaxial with said motor; then reducing said second predetermined arc to a third, smaller, predetermined arc via a second gear reducer which is coaxial with said first gear reducer;

rotating an output shaft, which is coaxial with said second gear reducer, through said third predetermined arc; and then rotating said object through said third predetermined arc via an element which connects said output shaft to said object and which compensates for radial and axial misalignments between said output shaft and said object, said step of rotating said object through said third predetermined arc comprising the step of rotating said object through said third predetermined arc via a bellows which connects said output shaft to said objects;

wherein said step of rotating said object through said third predetermined arc further comprises the step of rotating an adapter cup, the said adapter cup having:

an end plate which is located proximate said output end of said housing and which is connected to said output shaft and a shell which extends axially from said end plate towards said input end of said housing and which has a distal end which is rotatably mounted on said housing and which is connected to said bellows.

* * * * *